(12) United States Patent
McGhie et al.

(10) Patent No.: US 7,637,512 B1
(45) Date of Patent: Dec. 29, 2009

(54) METHOD FOR IMPROVING THE TURNING CHARACTERISTICS OF A BOOM SUPPORT VEHICLE AND APPARATUS THEREFOR

(76) Inventors: James R. McGhie, 93 Teton Pines, Henderson, NV (US) 89074; Robb I. McGhie, 8400 S. Maryland Pkwy., No 1059, Las Vegas, NV (US) 89123

(\*) Notice: Subject to any disclaimer, the term of this patent is extended or adjusted under 35 U.S.C. 154(b) by 326 days.

(21) Appl. No.: 11/637,498

(22) Filed: Dec. 12, 2006

Related U.S. Application Data
(60) Provisional application No. 60/751,926, filed on Dec. 20, 2005.

(51) Int. Cl.
*B62D 53/04* (2006.01)
(52) U.S. Cl. ............... 280/93.504; 280/404; 280/411.1
(58) Field of Classification Search ............ 280/93.504, 280/98, 404, 476.1, 411.1; 212/294; 414/680, 414/718
See application file for complete search history.

(56) References Cited

U.S. PATENT DOCUMENTS

| | | | | |
|---|---|---|---|---|
| 4,441,730 A | \* | 4/1984 | Damm | 280/426 |
| 4,451,058 A | \* | 5/1984 | Curry | 280/476.1 |
| 4,759,563 A | \* | 7/1988 | Nash | 280/476.1 |
| 4,762,192 A | \* | 8/1988 | Maxwell | 180/14.2 |
| 4,943,078 A | \* | 7/1990 | McGhie et al. | 280/408 |
| 4,982,976 A | \* | 1/1991 | Kramer | 280/426 |
| 5,280,939 A | \* | 1/1994 | Kee et al. | 280/432 |
| 5,797,615 A | \* | 8/1998 | Murray | 280/441.2 |
| 6,273,447 B1 | \* | 8/2001 | Vande Berg | 280/476.1 |
| 6,371,505 B1 | \* | 4/2002 | Turner, II | 280/441.2 |
| 7,413,393 B1 | \* | 8/2008 | Barnes | 414/373 |

\* cited by examiner

*Primary Examiner*—Paul N Dickson
*Assistant Examiner*—Nicole Verley
(74) *Attorney, Agent, or Firm*—Ted Masters

(57) ABSTRACT

A boom support vehicle for supporting elongated loads includes a front dolly which is pivotally connected to a rear dolly at an articulation point. The front dolly includes a front self steering castor axle, and a rear conventional axle. This combination of axles results in stability at high speeds, while also reducing the amount of scuffing which the boom support vehicle experiences as the transporting vehicle and the boom support vehicle negotiate a turn.

3 Claims, 4 Drawing Sheets

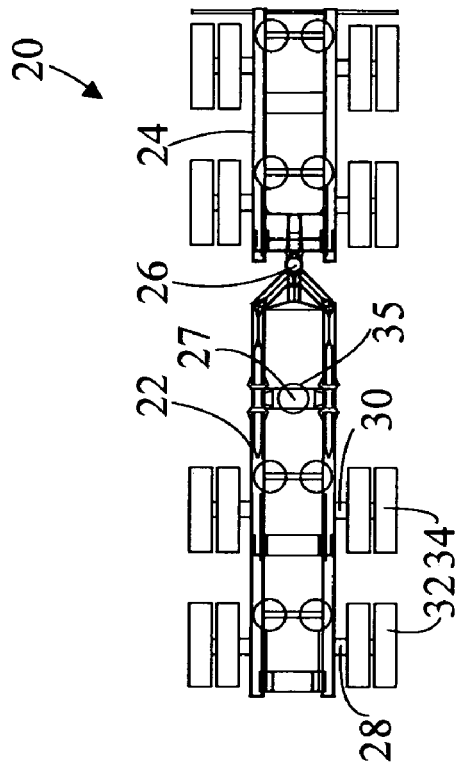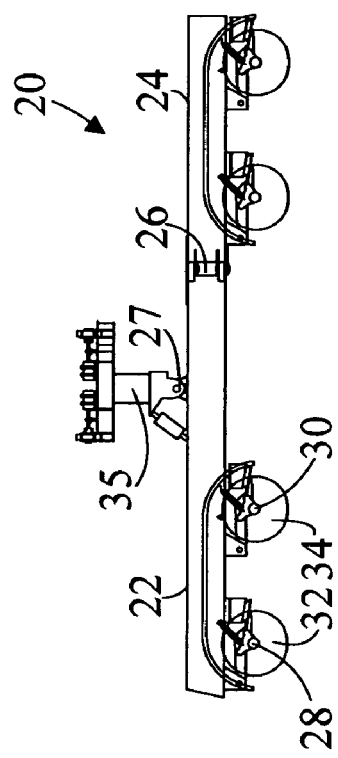

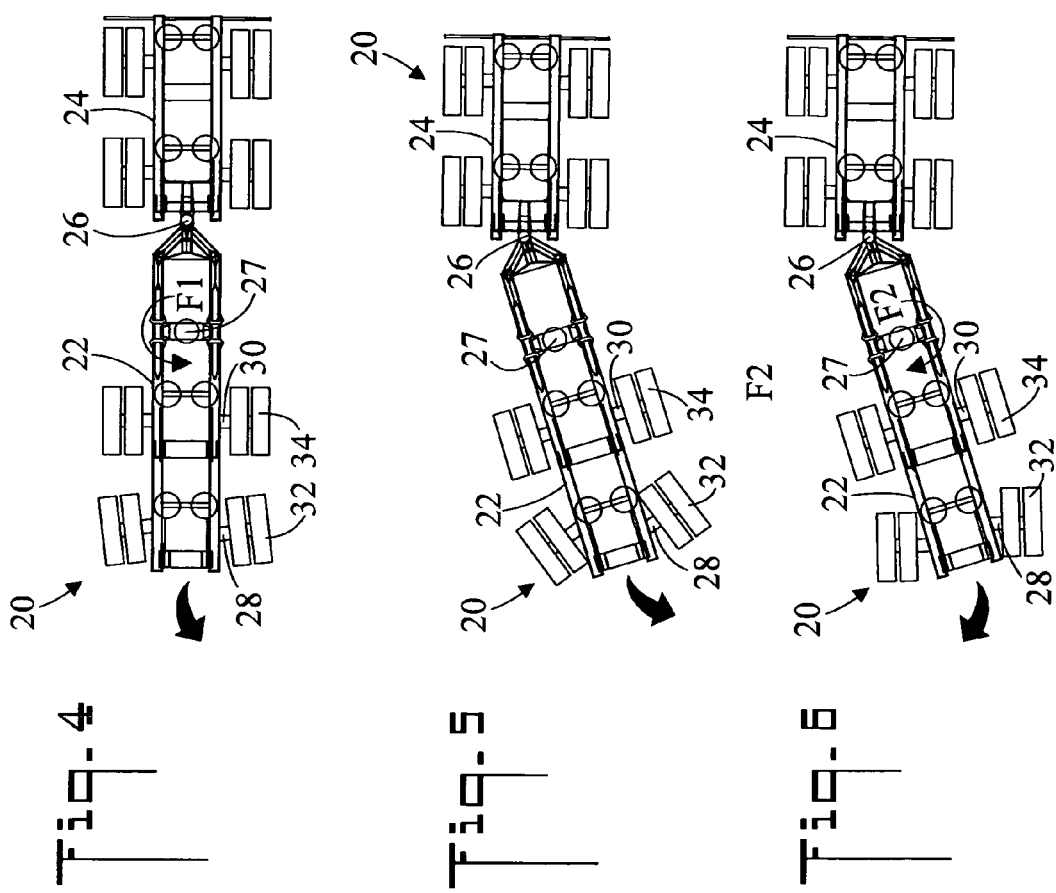

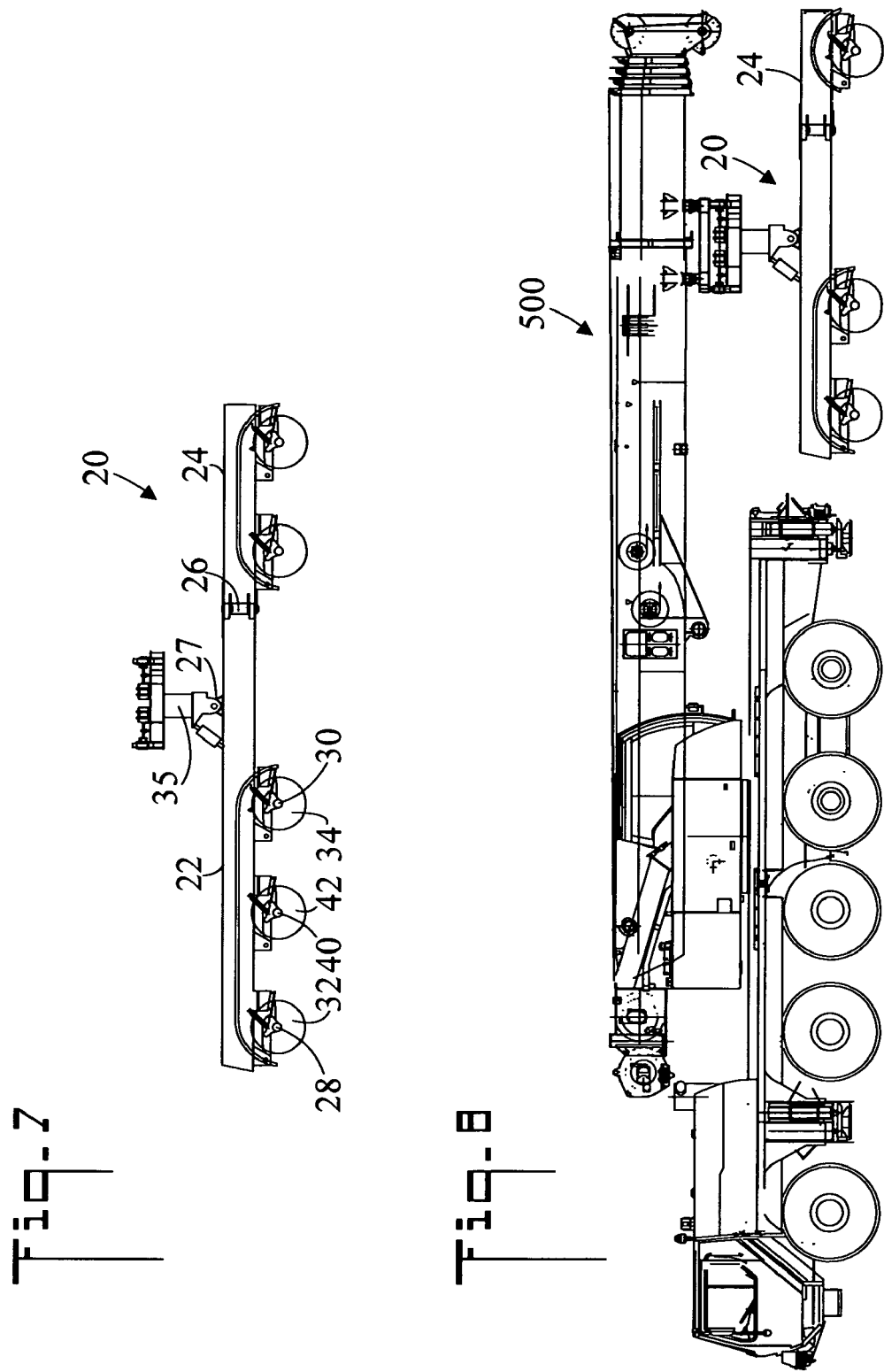

METHOD FOR IMPROVING THE TURNING CHARACTERISTICS OF A BOOM SUPPORT VEHICLE AND APPARATUS THEREFOR

CROSS REFERENCE TO RELATED APPLICATION

This application claims the filing benefit under 35 U.S.C. §119(e) of U.S. Provisional Application No. 60/751,926, filed Dec. 20, 2005, which is included herein by reference.

TECHNICAL FIELD

The present invention generally pertains to a boom support vehicle for supporting an elongated load, and more particularly to a boom support vehicle which has improved turning characteristics and reduces tire scuffing.

BACKGROUND OF THE INVENTION

A boom support vehicle is a trailer attached to the boom of a crane for the purpose of supporting a portion of the weight of the boom of the crane when using a crane carrier to move the crane over roadways. The additional axles provided by the boom support vehicle take some of the crane's heavy weight, thereby lowering the per axle load exerted on the roadway to a level which is within regulatory limits. The boom support vehicle also takes boom-related forces that result from the crane carrier and boom support vehicle going into and coming out of a turn. As cranes have increased in size, boom support vehicles have necessarily been modified to accommodate these larger loads. For example, boom support vehicles have been equipped with hydraulic suspension and better boom-to-vehicle connections to better travel safely on the highway at higher speeds. Typical boom support vehicles include articulated front and rear dollys which have conventional axles. The dolly tower is rigidly connected to the elongated load and pin connected to the top surface of the boom support vehicle by lateral pins to allow the dolly to pivot in a fore and aft direction.

As the carrier steers and pivots about the crane turntable bearing it is essentially pulling the crane boom sideways, generating a torque into the boom support vehicle's vertical tower and thus into the boom support vehicle itself. This generates high structural force through the dolly, and this results in the tires side scuffing from the torsion that results. In addition, all components are subjected to the side forces created (suspension, suspension support brackets, etc.).

Presently nothing has been developed to eliminate or reduce the scuffing (dragging of the boom support vehicle tires) which occurs as consistently larger crane carriers and boom support vehicles enter and come out of turns. The scuffing is particularly severe on the tires of the boom support vehicle's front axle.

BRIEF SUMMARY OF THE INVENTION

The present invention is directed to a boom support vehicle which reduces tire scuffing, reduces structural size, and provides improved turning characteristics. To accomplish this, the boom support vehicle of the present invention includes the following combination of features:

(1) A self steering castor axle as the front axle of the boom support vehicle front dolly, similar to the castor axle of some three axle semi trailers;

(2) A conventional axle as the rear axle of the boom support vehicle front dolly;

(3) A two member articulated boom support vehicle design which has an articulation point (steering pivot) near the rear of the vehicle;

(4) A rigid multiple point connection of the boom support vehicle tower to the boom of the crane; and, (5) A boom support vehicle tower to frame connection that allows the support vehicle to pivot fore and aft.

As the boom support vehicle of the present invention enters a turn, a scuffing force is generated at the boom support vehicles front axles. This scuffing force translates to the self steering castor axle located on the front of the vehicle, and in turn makes the self steering castor axle steer, thus improving the vehicles turning characteristics and improving the overall durability of the vehicle by using the scuffing force to the vehicles advantage. The articulated rear member of the vehicle follows the front member into the turn. The self steering feature of the present invention, in combination with a boom support vehicle's rigid connection at the boom, helps the crane carrier and boom support vehicle combination track better by reducing the scuffing taking place on the boom support vehicles' front tandem, in addition to still allowing the combination to achieve highway speeds without side sway and better force and tracking turning characteristics. Without the use of this front self steering axle, a boom support vehicle could not be made light enough in more restrictive states to handle the turning-related forces and still obtain a road permit in conjunction with a larger crane.

The combination of the above cited features, and particularly the self steering front axle combined with the conventional rear axle and rigid connection at the boom, helps the boom support vehicle turn and resultantly eliminates or reduces the amount of scuffing which the boom support vehicle experiences as the crane carrier and boom support vehicle negotiate a turn. Consequently, the present invention improves the turning characteristics of the boom support vehicle while simultaneously providing the ability to safely travel at higher speeds. due to the fact that the non-steering axle is used in combination with the self steering castor axle.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 2 is a top plan view of the boom support vehicle;

FIG. 3 is side elevation view of the boom support vehicle;

FIG. 4 is a top plan view of the boom support vehicle as it enters a turn;

FIG. 5 is a top plan view of the boom support vehicle during the turn;

FIG. 6 is a top plan view of the boom support vehicle as it exits a turn;

FIG. 7 is a side elevation view of a second embodiment of the boom support vehicle, and, FIG. 8 is a side elevation view of a third embodiment of the boom support vehicle.

DETAILED DESCRIPTION OF THE INVENTION

Figure 1:
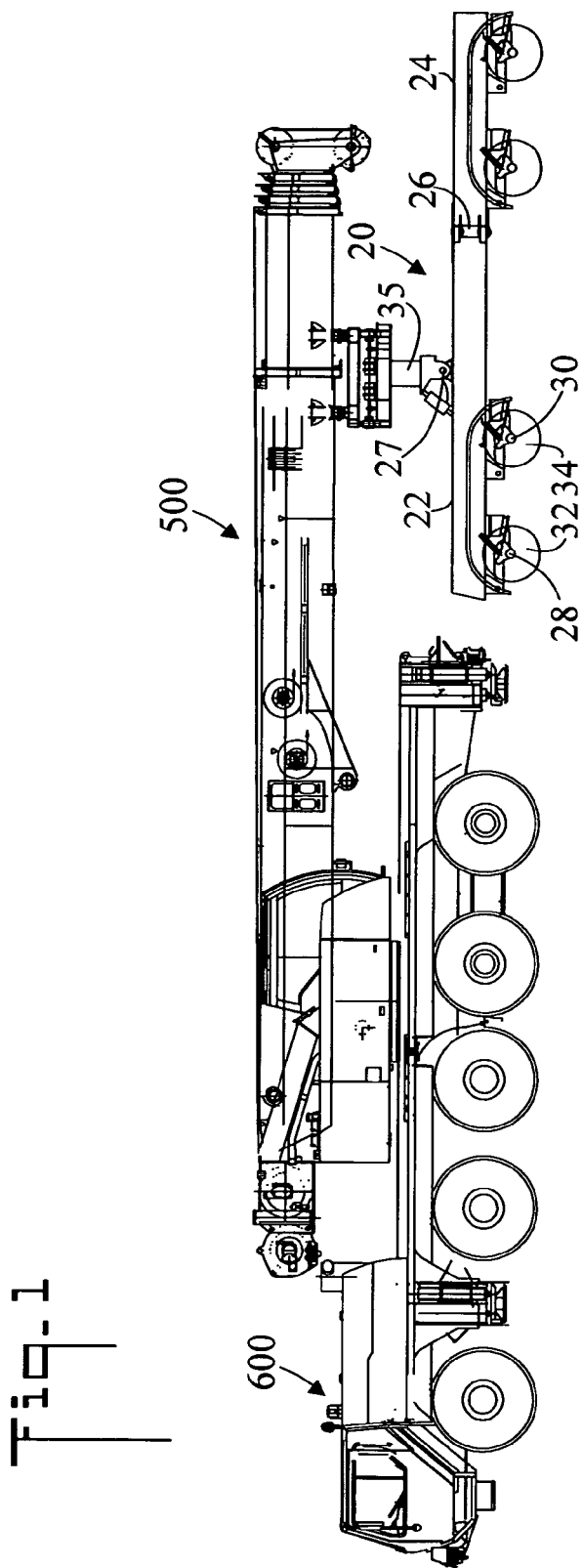
FIG. 1 is a side elevation view of an elongated load carried by a vehicle, and a boom support vehicle in accordance with the present invention.

Referring initially to FIG. 1, there is illustrated a side elevation view of an elongated load 500 carried by a vehicle 600, and a boom support vehicle in accordance with the present invention, the boom support vehicle generally designated as 20. FIGS. 2 and 3 show top plan and side elevation views respectively of boom support vehicle 20. In the shown embodiment, the elongated load 500 is the boom of a crane which is carried by a crane carrier 600. Boom support vehicle 20 includes a two axle front dolly 22 which is pivotally connected to a two axle rear dolly 24 at an articulation point 26 (also refer to FIG. 2). Front dolly 22 is connected to elongated load 500 via boom support vehicle tower 35 in the conventional rigid manner wherein a dolly pivot point 27 allows for fore and aft pivoting (such as when going over a bump in the road). Front dolly 22 has a front axle 28 and a rear axle 30. Front axle 28 is a self steering castor axle, so that as vehicle 600 turns front axle 28 will follow the turn. That is, front axle 28 and its tires will automatically turn to the right as the towing vehicle 600 turns to the right, and will similarly turn to the left as the towing vehicle 600 turns to the left. Front axle 28 has a plurality of tires 32 (four in the shown embodiment). The turning (steering) of front axle 28 virtually eliminates scuffing of tires 32 of front axle 28. Elongated load 500 is connected to front dolly 22 between rear axle 30 and articulation point 26.

Rear axle 30 carries a plurality of tires 34. Rear axle 30 is not a self steering castor axle, but is rather a conventional axle which does not turn. As such when vehicle 600 enters a turn or exits a turn tires 34 of rear axle 30 will scuff (that is move sideways). The scuffing is caused by the sideways force elongated load 500 exerts upon the boom support vehicle 20 (also refer to FIGS. 4-6 and the associated discussions). The scuffing of the tires 34 of rear axle 30 has a positive stabilizing effect on boom support vehicle 20. It is the combination of front self steering castor axle 28 and conventional (not self steering) rear axle 30 which results in the improved turning characteristics of the present invention. Front dolly 22 of boom support vehicle 20 can also have three axles; a front self steering castor axle and two conventional axles (refer to FIG. 7 and the related discussion).

FIG. 4 is a top plan view of boom support vehicle 20 just as it starts to enter a turn. As the turn is entered, front self steering axle 28 follows the turn (to the left). Simultaneously elongated load 500 (crane, see FIG. 1) exerts a torsional force F1 at dolly pivot point 27. Torsional force F1 causes tires 34 of rear axle 30 to scuff in the direction of the turn.

FIG. 5 is a top plan view of the boom support 20 vehicle during the turn. Front self steering axle 28 holds its position around the turn. Rear axle 30 follows the turn without scuffing.

FIG. 6 is a top plan view of the boom support vehicle 20 as it exits a turn. As the turn is exited, front self steering axle 28 follows the turn (to the right). Simultaneously elongated load 500 (crane, see FIG. 1) exerts a torsional force F2 at dolly pivot point 27. Torsional force F2 causes tires 34 of rear axle 30 to scuff in the direction of the return.

The conventional rear axle 30 and the resulting scuffing of the tires 34 of the rear axle 30 is important in that it causes the boom support vehicle 20 to more quickly assume proper alignment when entering or exiting a turn. Additionally, the conventional rear axle 30 stabilizes boom support vehicle 20 when it is travelling on a road, and particularly a crowned road. As such, a self steering castor axle would not be appropriate for second axle 30.

FIG. 7 is a side elevation view of a second embodiment of boom support vehicle 20. In this embodiment front dolly 22 has three axles; a front self steering castor axle 28 and a rear conventional axle 30 as in FIGS. 2-6, and additionally a middle conventional axle 40 which has a plurality of tires 42. Middle conventional axle 40 is disposed between front axle 28 and rear axle 30. As vehicle 600 enters a turn or exits a turn tires 42 of middle axle 40 will scuff, in addition to the scuffing of tires 34 of rear axle 30. This embodiment is useful for supporting a heavier elongated load 500, and provides more high speed stability.

FIG. 8 is a side elevation view of a third embodiment of boom support vehicle 20. In this embodiment rear dolly 24 only has one axle. This configuration would be suitable for supporting a lighter elongated load 500 which does not require two supporting axles.

It may be appreciated that the boom support vehicle of the present invention could also be utilized to support elongated loads other than the crane of a crane carrier. Additionally, self steering castor axles are known in the art and are available from a variety of manufactures.

A method for improving the turning characteristics of a boom support vehicle 20, includes:

(a) providing an elongated load 500 carried by a vehicle 600;

(b) providing a boom support vehicle 20 which supports elongated load 500, boom support vehicle 20 including;

front dolly 22 pivotally connected to a rear dolly 24;

front dolly 22 rigidly connected to elongated load 500 via tower 35 of boom support vehicle 20;

front dolly 22 having a front axle 28 and a rear axle 30, front axle 28 being a self steering castor axle;

rear axle 30 carrying a plurality of tires 34;

rear axle 30 being a conventional axle (not a self steering castor axle);

(c) causing vehicle 600 to enter or exit a turn wherein (1) front axle 28 follows the entry or exit, and (2) the tires 34 of rear axle 30 scuff during the entry or exit.

The preferred embodiments of the invention described herein are exemplary and numerous modifications, variations, and rearrangements can be readily envisioned to achieve an equivalent result, all of which are intended to be embraced within the scope of the appended claims.

We claim:

1. A method for improving the turning characteristics of a boom support vehicle, comprising:

(a) providing an elongated load carried by a vehicle;

(b) providing a boom support vehicle which supports said elongated load, said boom support vehicle including;

a front dolly pivotally connected to a rear dolly at an articulation point;

said front dolly connected to said elongated load;

said front dolly having a front axle and a rear axle, said front axle being a self steering castor axle, so that as the vehicle turns said front axle will follow the turn of said vehicle;

said rear axle carrying a plurality of tires;

said rear axle being a conventional axle, so that as the vehicle enters a turn or exits a turn said tires of said rear axle will scuff;

said boom support vehicle having a tower which is rigidly connected to said elongated load;

said elongated load connected to said front dolly between said rear axle and said articulation point;

(c) causing said vehicle to enter or exit a turn wherein (1) said front axle follows said entry or exit, and (2) said tires of said rear axle scuff during said entry or exit.

2. A boom support vehicle for supporting an elongated load carried by a vehicle, said boom support vehicle comprising;

a front dolly pivotally connected to a rear dolly at an articulation point;

said front dolly connected to the elongated load;

said front dolly having a front axle and a rear axle, said front axle being a self steering castor axle, so that as the vehicle turns said front axle will follow the turn of the vehicle;

said rear axle carrying a plurality of tires;

said rear axle being a conventional axle, so that as the vehicle enters a turn or exits a turn said tires of said rear axle will scuff;

said boom support vehicle having a tower which is rigidly connected to said elongated load; and, said elongated load connected to said front dolly between said rear axle and said articulation point.

3. The boom support vehicle according to claim 2, further including:

said front dolly having a middle axle disposed between said front axle and said rear axle, said middle axle being a conventional axle, said middle axle having a plurality of tires; and, so that as the vehicle enters a turn or exits a turn said tires of said middle axle will scuff.

* * * * *

UNITED STATES PATENT AND TRADEMARK OFFICE
CERTIFICATE OF CORRECTION

| | | |
|---|---|---|
| PATENT NO. | : 7,637,512 B1 | Page 1 of 1 |
| APPLICATION NO. | : 11/637498 | |
| DATED | : December 29, 2009 | |
| INVENTOR(S) | : James R. McGhie and Robb I. McGhie | |

It is certified that error appears in the above-identified patent and that said Letters Patent is hereby corrected as shown below:

On the Title Page, Item (76) should read,

James R. McGhie  ~~U.S.A.~~  United Kingdom

Robb I. McGhie  ~~U.S.A.~~  Canada

Signed and Sealed this
Tenth Day of May, 2011

David J. Kappos
*Director of the United States Patent and Trademark Office*